United States Patent [19]

Gaus et al.

[11] 4,417,484

[45] Nov. 29, 1983

[54] PLANETARY CHANGE-SPEED TRANSMISSION FOR AUTOMOTIVE VEHICLES

[75] Inventors: Hermann Gaus, Stuttgart; Wolfgang Zaiser, Steinheim-Sontheim; Jürgen Pickard, Wernau; Georg Eltze, Stuttgart, all of Fed. Rep. of Germany

[73] Assignee: Daimler-Benz Aktiengesellschaft, Stuttgart, Fed. Rep. of Germany

[21] Appl. No.: 204,900

[22] Filed: Nov. 7, 1980

[30] Foreign Application Priority Data

Nov. 7, 1979 [DE] Fed. Rep. of Germany ....... 2944884

[51] Int. Cl.³ ...................... F16H 47/68; F16H 57/10
[52] U.S. Cl. ...................................... 74/688; 74/759; 74/761; 74/766
[58] Field of Search ................. 74/688, 760, 761, 766, 74/753, 768, 758, 759

[56] References Cited

U.S. PATENT DOCUMENTS

| | | | |
|---|---|---|---|
| 2,901,923 | 9/1959 | Wallawer | 74/688 |
| 3,106,107 | 10/1963 | Hardy | 74/688 |
| 4,098,238 | 5/1978 | Forster et al. | 74/761 X |

*Primary Examiner*—George H. Krizmanich
*Attorney, Agent, or Firm*—Craig & Burns

[57] ABSTRACT

A change-speed transmission for motor vehicles, with the transmission including a planetary gear transmission arrangement having a pair of sun gears, a pair of ring gears, and a double webbed planetary gear carrier supporting at least one primary planetary gear and at least one secondary planetary gear. The primary planetary gear meshes with one of the sun gears and the secondary planetary gear meshes with the primary planetary gear and the other of the sun gears. One sun gear, acting as a free transmisson member and one ring gear are respectively adapted to be brought into an operative connection by a gear shift brake arrangement. The other sun gear as well as a further transmission member may be placed in a driving connection with the input shaft of the transmission. Both ring gears mesh with the primary planetary gear and one of the ring gears as well as the transmission member acting on the output shaft may be brought into driving connection respectively with one transmission member of a planetary gear coupling transmission. An additional transmission member of the planetary gear coupling transmission is adapted to be connected to the output shaft of the transmission.

22 Claims, 6 Drawing Figures

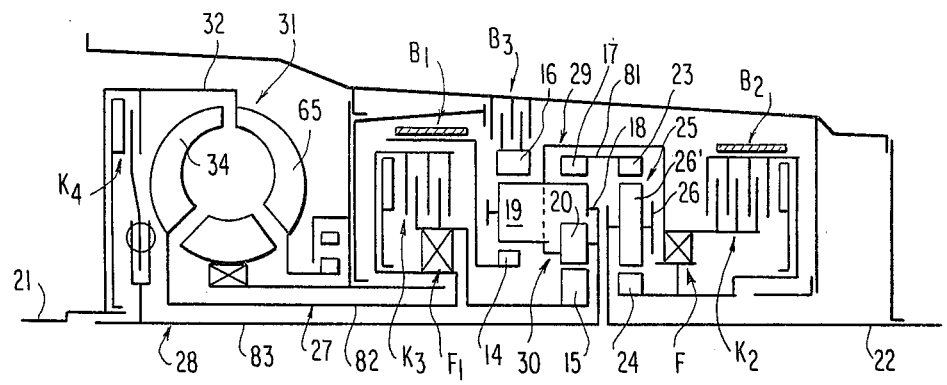
FIG. 1
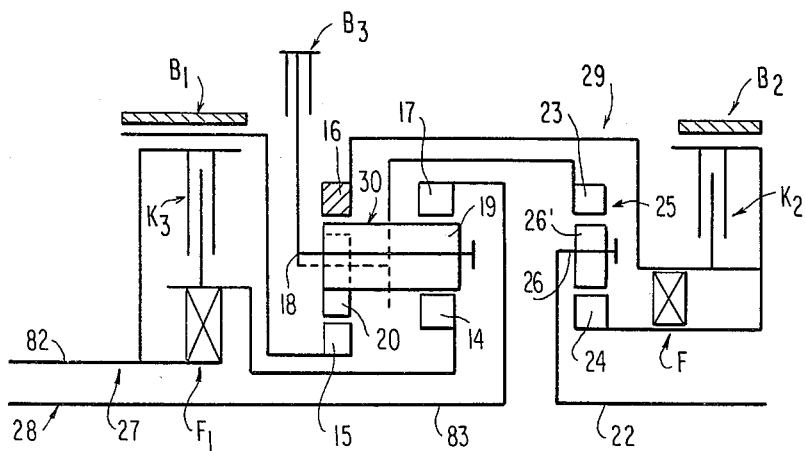
FIG. 2
FIG. 3
|   | $B_1$ | $B_2$ | $B_3$ | $K_3$ | $K_2$ | $K_4$ | $F_1$ | F |
|---|---|---|---|---|---|---|---|---|
| I |   | X |   | X | X |   | X | X |
| II | X | X |   | X |   |   | X |   |
| III |   | X |   | X |   | X | X |   |
| IV |   |   |   |   | X | X | X | X |
| V | X |   |   |   |   | X | X |   |
| R |   |   | X | X | X |   | X | X |

PLANETARY CHANGE-SPEED TRANSMISSION FOR AUTOMOTIVE VEHICLES

The present invention relates to a transmission and, more particularly, to an automatic planetary gear change-speed transmission for motor vehicles which includes a double-webbed planetary gear transmission having each two sun gears and ring gears and with a fifth transmission member formed by a double-webbed planetary gear carrier with a primary or main planet gear and a secondary or auxiliary planet gear, and in which the main or primary planet gear meshing with the secondary or auxiliary planet gear furthermore meshes with one sun gear as well as with one ring gear and the other sun gear meshes with the secondary planet gear, in which one sun gear is acting as a free transmission member and one ring gear can be brought into an operative connection with a gear shift brake and the other sun gear as well as a further transmission member can be drivingly connected with an input shaft driveable by a driving engine and the remaining transmission member acts on an output shaft adapted to be coupled with wheels of the motor vehicle.

In a change-speed trasmission of the aforementioned type (U.S. Pat. No. 2,901,923), the carrier is connected to the output shaft while the on ring gear, which is larger in diameter, cooperates with the primary or main planet gear by way of a further auxiliary planet gear. Although this prior art change-speed transmission provides for five forward speeds and one reverse speed, with the fifth speed or gear being designed as an overspeed gear, the largest speed reduction ratio obtainable for the lowest gear is only about 2:1. An increase of the reduction ratio for the lowest speed or gear to about 3:1 to 4:1 would lead in this prior art transmission to a further enlargement of the large ring gear; however, such enlargement is undesirable. Finally, it is unavoidable in this prior art change-speed transmission that during the speed changes between the reduced forward speeds, a group change of the participating gear shift control members occurs.

The aim underlying the present invention essentially resides in providing a change-speed transmission of the aforementioned type with a fifth speed or gear functioning as an overdrive which enables the realization of a larger speed reduction ratio for the lowest speed while avoiding group change as well as a necessary enlargement of the size of the ring gears.

The underlying problems are solved in accordance with the present invention in that both ring gears mesh with the primary or main planet gear and in that one ring gear as also the transmission member acting on the output shaft are adapted to be brought into driving connection with one transmission member each of a planetary gear coupling transmission while a third transmission member of the coupling transmission is adapted to be connected to the output shaft.

With the change-speed transmission in accordance with the present invention, the driving clutch for one sun gear of a primary or main planet gear is able to provide the drive for all reduced forward speeds so that no group change occurs.

Moreover, with the change-speed transmission of the present invention, both ring gears of the primary or main planet gear are of equal size so that the transmission is more compact and simpler in its manufacture.

Additionally, with the change-speed transmission of the present invention, the coupling transmission provides an additional speed reduction for the lowest gear whereby the total transmission ratio is increased.

In accordance with further advantageous features of the present invention, the driving clutch for the one sun gear of the double-webbed transmission needs to be controlled only in a coasting operation of the reduced forward gears. For this purpose, a one way roller clutch is connected into the driving connection between the input shaft and the one sun gear of the double-webbed transmission. In the change-speed transmission of the present invention, the construction of the coupling transmission may be of any desired, known type. For example, the coupling transmission may consist of a simple one-webbed planetary gear transmission, of a double-webbed planetary gear transmission, or of several connected planetary gear sets.

In accordance with the present invention, the ring gear of the primary or main planet gear disposed opposite to the input shaft may be drivingly connected with a transmission member of the coupling transmission and the carrier of the primary or main planet gear may be drivingly connected with the input shaft.

Additionally, in accordance with the present invention, a planetary gear carrier of the coupling transmission may be connected with the output shaft and a central gear may be brought into driving connection with the ring gear of the primary or main planet gear facing the input shaft.

With a change-speed transmission having a hydrodynamic torque converter or flow unit, in which the impeller is connected to the input shaft and a driving clutch is inserted in a driving connection between a further impeller of the hydrodynamic flow unit and the one sun gear of the double-webbed transmission and a further driving clutch is inserted in a driving connection between the input shaft and the further transmission member of the double-webbed transmission, according to a further feature of the present invention, the two impellers are operable to be fixed in position relative to each other directly by a bridging clutch and the two driving clutches may be operatively connected between the secondary clutch half of the bridging clutch and the associated transmission member.

In accordance with further features of the present invention, the double-webbed carrier may be connected to a driving web disposed axially between the two sun gears of the double-webbed transmission, and the driving clutch, not associated with the one sun gear, acts on a hollow shaft extending through the sun gear facing the input shaft and is connected to the driving web.

The two driving clutches, in accordance with the present invention, are arranged with respect to their position between the hydrodynamic flow unit or torque converter and the double-webbed transmission while the secondary clutch half of the driving clutch lying between the hydrodynamic flow unit and the other driving clutch may be connected, by way of an intermediate shaft extending through the hollow shaft connected to the driving web, with the sun gear of the double-webbed transmission disposed opposite to the input shaft.

In accordance with another feature of the present invention, a driving drum may be connected to the two lateral driving webs between which a central driving web is disposed; one lateral driving web may be connected with an intermediate shaft connected with the secondary clutch half of the bridging clutch and the other lateral driving web may be connected to a hollow shaft, while the central driving web is connected with the intermediate shaft extending through this hollow shaft and connected with the sun gear; the driving drum includes a primary clutch half and the central driving web the secondary clutch half of the driving clutch of the sun gear.

In accordance with still further features of the present invention, a one way roller or free-wheeling clutch is arranged within the driving drum in such a manner that one clutch ring or race is connected to the central driving web and the other clutch ring or race is connected to the intermediate shaft connected to the secondary clutch half of the bridging clutch.

In accordance with the present invention, the two ring gears of the primary planetary gear have preferably the same number of teeth.

Accordingly, it is an object of the present invention to provide a planetary gear change-speed transmission for motor vehicles which avoids, by simple means, the aforementioned shortcomings and disadvantages encountered in the prior art.

Another object of the present invention resides in providing a planetary change-speed transmission for motor vehicles which enables the attainment of a large speed reduction ratio for the lowest speed.

A further object of the present invention resides in providing a planetary change-speed transmission for motor vehicles which avoids a group changing during shifting of reduced forward speeds.

Yet another object of the present invention resides in providing a change-speed transmission which is simple in construction and therefore relatively inexpensive to manufacture.

A further object of the present invention resides in providing a planetary gear change-speed transmission for motor vehicles which enables an increase in the total transmission ratio.

These and other objects, features, and advantages of the present invention will become more apparent from the following description when taken in connection with the accompanying drawings which show, for the purposes of illustration only, several embodiments in accordance with the present invention, and wherein:

FIG. 1 is a schematic longitudinal view of a change-speed transmission for motor vehicles in accordance with the present invention;

FIG. 2 is a schematic view of a second embodiment of a change-speed transmission for motor vehicles in accordance with the present invention;

FIG. 3 is a shifting diagram illustrating the shifting pattern of gear shift control members of the planetary change-speed transmission of FIGS. 1 and 2;

Figure 4:
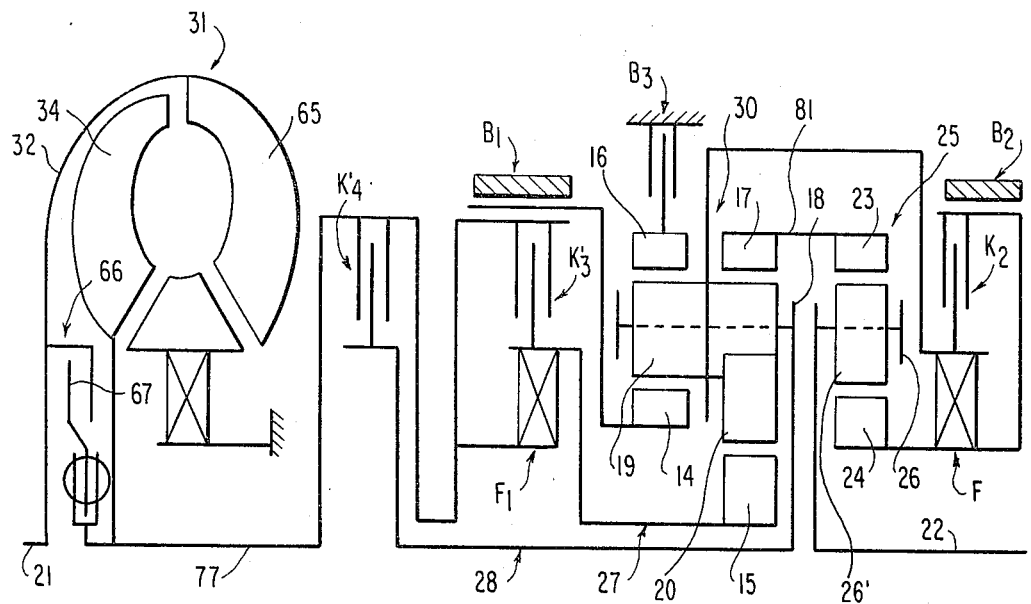
FIG. 4 is a schematic longitudinal view of a further modified embodiment of a planetary change-speed transmission for motor vehicles in accordance with the present invention.

Referring now to the drawings wherein like reference numerals are used throughout the various views to designate like parts and, more particularly to FIG. 1, according to this Figure, an input shaft 21 adapted to be driven by a driving engine (not shown) of a motor vehicle (not shown) is connected by way of a drive connection generally designated by the reference numeral 27 to a sun gear 15 and by way of a drive connection generally designated by the reference numeral 28 to a carrier 18 of a double-webbed planetary gear transmission generally designated by the reference numeral 30. The driving connection 27 includes a hydrodynamic torque converter generally designated by the reference numeral 31, a driving clutch generally designated by the reference character $K_3$ connected after the torque converter, and a one-way free wheeling clutch generally designated by the reference character $F_1$ connected in parallel with the driving clutch $K_3$.

The gear carrier 18 carries at least one primary or main planet gear 19 and at least one secondary or auxiliary planet gear 20 meshing with the primary or main planet gear 19. The secondary or auxiliary planet gear 20 meshes with a sun gear 15. The primary or main planet gear 19 furthermore meshes with a further sun gear 14 as well as with two ring gears 16 and 17. The further sun gear 14 and the ring gear 16 which are free transmission members, are adapted to be fixedly braked by a gear shift brake generally designated by reference character $B_1$ and $B_3$ respectively. The ring gear 17 is connected to a ring gear 23 of a coupling transmission generally designated by reference numeral 25, whose a planetary gear carrier 26 carrying at least one planet gear 26' is connected with an output shaft 22 adapted to be coupled, in a conventional manner, with wheels (not shown) of the motor vehicle.

The coupling transmission 25 also includes a sun gear 24 adapted to be connected to the carrier 18 by way of a driving connection generally designated by the reference numeral 29. The driving connection 29 includes, in a parallel arrangement, a one way or free wheeling clutch generally designated by reference character F and a gear shift clutch generally designated by reference character $K_2$. The sun gear 24 is additionally adapted to be braked by the gear shift brake $B_2$.

A housing 32, driven by the input shaft 21, is connected to the impeller 65 of the hydrodynamic torque converter generally designated by reference numeral 31 whose turbine 34 is connected by way of an intermediate shaft 82, with the one way or free wheeling clutch $F_1$ and the driving clutch $K_3$. The driving connection 28 includes an intermediate shaft 83 which is connected to the carrier 18. The intermediate shaft 83 is adapted to be connected with the input shaft 21 by way of the driving clutch generally designated by the reference character $K_4$. The one-way or free-wheeling clutches F and $F_1$ prevent in each case a backward rotation of the hub with respect to the shaft.

A shown in FIG. 3, in first gear, the gear shift brake $B_2$ and the driving clutch $K_3$ is engaged. Consequently, the sun gear 15 are being driven while the carrier 18 is fixedly braked indirectly by way of the one way clutch F and the sun gear 24 is fixedly braked directly by the gear shift brake $B_2$. In this manner, the highest speed reduction is engaged in the transmission 30 with the carrier 18 fixed or stationary, which together with the reduction of the coupling transmission 25, produces an overall transmission ratio for the lowest gear of about 4:1.

In the second gear, the brake $B_1$ is additionally engaged and thus the sun gear 14 is held fast. As a result thereof, the carrier 18 is driven in the driving direction of rotation by the primary or main planet gear 19 rolling off along the sun gear 14 so that the overall transmission ratio in the second gear is lower than in the first gear.

In third gear, the brake $B_1$ is disengaged and the driving clutch $K_4$ is engaged. As a result thereof, the transmission 30 is shifted into a transmission ratio 1:1 by the driving clutch $K_3$ remaining engaged so that only the speed reduction of the coupling transmission 25 is effective.

In fourth gear, the brake $B_2$ is disengaged and the gear shift clutch $K_2$ is engaged. As a result thereof, both transmission 30 and 25 are shifted into a direct or 1:1 transmission ratio so that the output shaft 22 has the same rotational speed as the input shaft 21.

In fifth gear, the gear shift brake $B_1$, the gear shift clutch $K_2$, and the driving clutch $K_4$ are engaged. As a result thereof, the carrier 18 is driven by the input shaft 21 so that the ring gears 17 and 23 are driven at an overdrive speed by way of the primary or main planet gear 19 rolling off on the fixedly braked sun gear 14. The coupling transmission 25 is shifted into direct by the gear shift clutch $K_2$ so that the output shaft 22 has the fast rotational speed of the ring gears 17 and 23.

In reverse gear, the gear shift brake $B_3$ is and the driving clutch $K_3$ are engaged. The sun gear 15, in driving connection with the input shaft 21, drives the carrier 18 by way of the primary or main planet gear 19 rolling off on the fixedly braked ring gear 16 in the opposite driving direction of rotation, which thus overtakes the ring gears 17 and 23 operating as a reaction member for the coupling transmission 25. The carrier 18 is coupled through the one way clutch F with the sun gear 24 which drives the carrier 26 in the opposite direction of rotation. In this reverse gear operation, a reduction still occurs in the coupling transmission 25 due to the relative rotation between the carrier 18 and the ring gear 23.

The change-speed transmission of FIG. 2 essentially conforms to the transmission of FIG. 1; however, in the transmission of FIG. 2, the position of the two sun gears 14, 15 in the transmission 30 is reversed with respect to each other and the driving connection 27 leads to the sun gear 14 meshing directly with the primary or main planet gear 19. The sun gear 15 meshing with the secondary or auxiliary planet gear 20 is then adapted to be fixedly braked by way of the gear shift brake $B_1$. Moreover, the driving connection 28 leads to the rear ring gear 17 and the driving connection 29 leads to the front ring gear 16. In all other features, the transmissions of FIGS. 1 and 2 coincide.

The shifting diagram of FIG. 3 also applied to the change speed transmission of FIG. 2. Accordingly, the gear shift brake $B_2$ and the driving clutch $K_3$ are engaged in the first gear. In this manner, the sun gear 24 is directly braked and the ring gear 16 is braked by way of the driving connection 29 and the one way clutch F, while the sun gear 14 is driven by the input shaft 21 by way of the intermediate shaft 82. The carrier 18 is driven in a forward direction of rotation by the primary or main planet gear 19 rolling off on the fixedly braked ring gear 16 with a reduced speed, whereby the ring gear 23 drives the carrier 26 and therewith the output shaft 22 with a further reduction toward lower speed.

With the change-speed transmission of FIG. 2 in second gear, the gear shift brake $B_1$ is additionally engaged, whereby also the ring gear 16, stationary in the first gear, rotates as a reaction member in the driving direction of rotation. As a result thereof, the carrier 18 continues to be speed reduced but is driven faster than in first gear so that, in second gear, a smaller overall speed reduction ratio results than in first gear.

In third gear, the driving clutches $K_3$ and $K_4$ as well as the gear shift brake $B_2$ are engaged. As a result thereof, the transmission 30 is shifted into direct so that the ring gear 23 of the coupling transmission 25 is driven from the input shaft 21 and the speed reduction results solely from the reduction of the coupling transmission 25.

To shift the change-speed transmission of FIG. 2 into fourth gear the gear shift brake $B_2$ is disengaged and the gear shift clutch $K_2$ is engaged. As a result thereof, the coupling transmission 25 is shifted into direct gear so that the input shaft 21 and output shaft 22 have the same speed.

In fifth gear, the gear shift brake $B_1$, the gear shift clutch $K_2$ and the driving clutch $K_4$ are engaged. In this manner, the sun gear 15 is fixedly braked, the ring gear 17 is driven by the input shaft 21, and the ring gear 16 is connected with the sun gear 24. A transmission ratio providing an increased speed occurs between the primary or main planet gear 19 and the secondary or auxiliary planet geaar 20 at the carrier cooperating as a reaction member with the ring gear 23 so that the ring gear 16 leads with respect to the ring gear 17 and, thus, with respect to the input shaft 21, i.e., rotates faster than the ring gear 17 and the input shaft 21. As a result thereof, the sun gear 24 drives the output shaft 22 at an increased or higher speed in the driving direction of rotation.

In reverse gear, the gear shift brake $B_3$, the driving clutch $K_3$, and the gear shift clutch $K_2$ are engaged. As a result thereof, the carrier 18 and the ring gear 23 are held fast and the sun gear 14 is driven by the input shaft 21. The sun gear 14 drives, by way of the primary or main planet gear 19, the ring gear 16 in the opposite direction of rotation, whereby the sun gear 24, connected to the ring gear 16 by way of the gear shift clutch $K_2$, drives the carrier 26 and therewith the output shaft 22 in the opposite driving direction of rotation.

The change-speed transmission of FIG. 4 differs in function and operation from FIG. 1 merely in that the driving clutch $K'_4$ for the carrier 18 does not act directly on the input shaft 21 but instead by way of a bridging clutch generally designated by the reference numeral 66. Additionally, the driving clutch $K_4'$ is not disposed in the housing 32 of the torque converter 31 but rather is located, with respect to the input shaft 21, to the rear of the hydrodynamic torque converter 31 and in front of the driving clutch $K_3'$. The arrangement of the change-speed transmission of FIG. 4 has the advantage that the hydrodynamic torque converter 31 can be bridged in all gears. With respect to all other features, the embodiments of FIGS. 1 and 4 conform with each other so that reference may be had, in this context, to the description of FIG. 1 and its operation.

With regard to the bridging clutch 66, as shown in FIG. 4, the clutch 66 is operatively connected between, on the one hand, the turbine 34 and the input shaft 21 and, on the other hand, the impeller 65. A secondary clutch half 67 of the bridging clutch 66 is connected to an intermediate shaft 77 which cooperates with the driving clutches $K_3'$ and $K_4'$.

Figure 5:
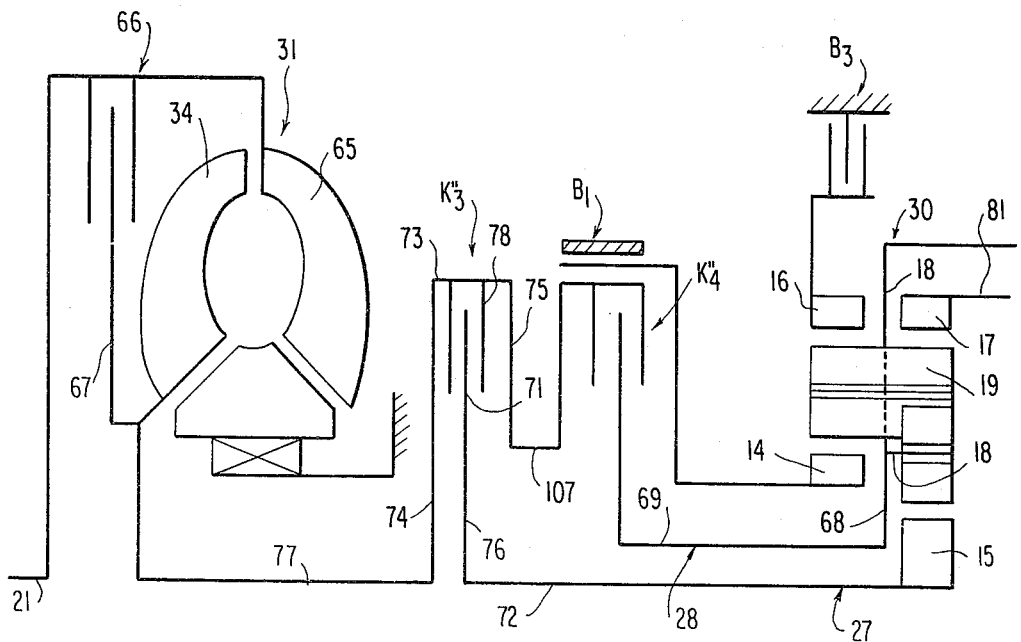
FIG. 5 is a schematic longitudinal view of a planetary change-speed transmission for motor vehicles in accordance with the present invention similar to FIG. 4 in which the position of the two driving clutches have been interchanged.

The embodiment of FIG. 5 differs from that of FIG. 4 only in that the driving clutch $K_3''$ is positionally arranged or located between the torque converter 31 and the driving clutch $K_4''$. This arrangement or location of the driving clutch $K_3''$ is achieved in that the driving clutch $K_4''$ rotates on a hollow shaft 69 which is connected to a driving web 68 of the carrier 18 disposed axially between the two sun gears 14 and 15. An intermediate shaft 72 which extends through the hollow shaft 69, connects the sun gear 15 with a central drive web 76 which is disposed between two lateral driving webs 74 and 75. The lateral driving webs 74 and 75 are connected to a driving drum 73 which includes the clutch half 78 of the driving clutch $K_3''$. The secondary clutch half 71 of the driving clutch $K_3''$ is connected to the driving web 76. While the one driving web 74 is connected to the intermediate shaft 77, the other driving web 75 leads to the driving clutch $K_4''$ by way of a hollow shaft 107. In all other respects the change-speed transmission of FIG. 5 corresponds to the transmission of FIG. 4.

Figure 6:
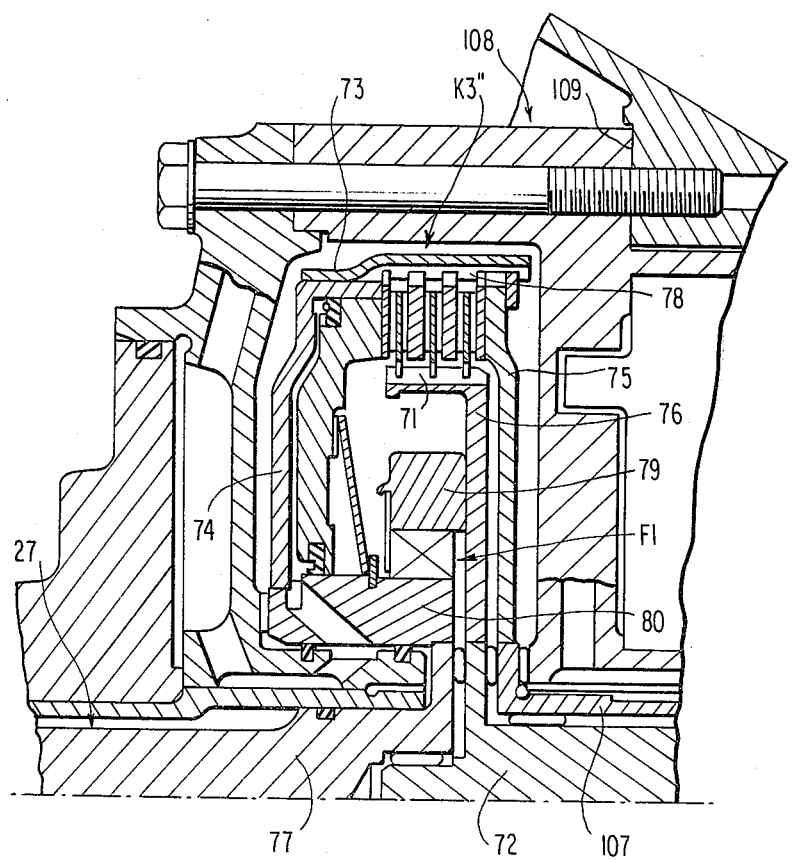
FIG. 6 is a partial axial cross sectional view through the driving clutch for the sun gear in the change-speed transmission of FIG. 5.

The embodiment of FIG. 6 represents a constructional realization of the arrangement of the driving clutch $K_3''$ in the change-speed transmission of FIG. 5. More particularly, a driving drum 73, constructed on its inside as an outer lamellae carrier 78 of the driving clutch $K_3''$, is connected with two lateral driving webs 74 and 75; a central driving web 76 which is disposed between the lateral driving webs 74 and 75, is provided with the inner lamellae carrier 71. The driving web 74 is connected to the intermediate shaft 77 by way of a coupling sleeve 80. The coupling sleeve 80 forms the inner race of the one-way or free-wheeling clutch $F_1$ whose outer race 79 is fixed at the driving web 76. The central driving web 76 is connected to an intermediate shaft 72 leading to the sun gear 15. The intermediate shaft 72 extends through a hollow shaft 107 leading to the driving clutch $K_4''$. The other lateral driving web 75 is connected to the hollow shaft 107.

The particular advantage of the change-speed transmission of FIG. 6 resides in the fact that the driving clutch $K_3''$ may be accommodated by an intermediate housing 108 which can be flanged to the front end wall 109 of a four-speed change-speed transmission.

While we have shown and described several embodiments in accordance with the present invention, it is understood that the same is not limited thereto but is susceptible of numerous changes and modifications as known to one having ordinary skill in the art and we therefore do not wish to be limited to the details shown and described herein, but intend to cover all such modifications as are encompassed by the scope of the appended claims.

We claim:

1. A change-speed transmission for a motor vehicle, the transmission comprising a plentary gear transmission means having a plurality of transmission members including a pair of sun gears, a pair of ring gears, and a double-webbed planetary gear carrier means supporting at least one primary planet gear meshing with one of the sun gears and at least one secondary planet gear meshing with the primary planet gear and the other of said sun gears, means for respectively fixedly braking one of the sun gears and one of the ring gears, means for drivingly connecting one of the sun gears to an input shaft of the transmission, and means for enabling the planetary gear carrier means to act upon an output shaft of the transmission, characterized in that the primary planet gear meshes with both of the ring gears, the enabling means includes a planetary gear coupling transmission means having a first transmission member, means are provided for bringing one of the ring gears and the planetary gear carrier means respectively into driving connection with the first transmission member and the input shaft, and in that a further transmission member of said plurality of transmission members of the gear coupling transmission means is connected to the output shaft.

2. A change-speed transmission according to claim 1, characterized in that means for drivingly connecting one of the sun gears to the input shaft includes a one-way clutch means arranged between said last-mentioned sun gear and the input shaft.

3. A change-speed transmission according to claim 1, characterized in that the means for bringing one of the ring gears and planetary gear carrier means respectively into driving connection with the first transmission member of the gear coupling transmission means and the input shaft includes a driving drum interposed between said last-mentioned ring gear and the first transmission member and a driving connection means interposed between the planetary gear carrier means and the input shaft, and in that said last-mentioned ring gear lines on the output side of the transmission.

4. A change-speed transmission according to claim 3, characterized in that the first transmission member of the gear coupling transmission means is a ring gear.

5. A change-speed transmission according to one of claims 1 or 2, characterized in that the first transmission member of the gear coupling transmission means is a sun gear, and in that one of the ring gears of the planetary gear transmission means which is brought into driving connection with the first transmission member of the gear coupling transmission means by said means for bringing one of said ring gears into driving connection with said first transmission means is the sun gear disposed nearer the input side of the transmission.

6. A change-speed transmission according to claim 5, characterized in that the further transmission member of the gear coupling transmission means is a planetary gear carrier.

7. A change-speed transmission according to claim 1, including a hydrodynamic torque converter means having a first and second impeller, characterized in that the means for drivingly connecting one of the sun gears of the planetary gear transmission means to the input shaft includes a first driving clutch means arranged between one of the sun gears of the planetary gear transmission means and the second impeller, a second driving clutch means is arranged between the planetary gear carrier means and the input shaft, a bridging clutch means is provided for relatively positionally fixing the first and second impellers with respect to one another, bridging clutch means includes a primary and secondary clutch half, and in that the first and second driving clutch means are operatively connected between the secondary clutch half of the bridging clutch means and the sun gear and planetary gear means, respectively.

8. A change-speed transmission according to claim 7, characterized in that a driving web means is interposed axially between the two sun gears of the planetary gear transmission means and is connected to the planetary gear carrier means, a hollow shaft extends through the sun gear of the pleanetary gear transmission means disposed nearer the input side of the transmission and is connected to the driving web means and the second driving clutch means.

9. A change-speed transmission according to claim 8, characterized in that the first and second driving clutch means are disposed between the torque converter means and the planetary gear carrier means, each of the first and second driving clutch means include a primary and secondary clutch half, the secondary clutch half of the first driving clutch means is disposed between the hydrodynamic torque converter means and the second driving clutch means, an intermediate shaft means connects the secondary clutch half of the first driving clutch means with the sun gear of the planetary gear transmission means lying nearer the output side of the transmission, and in that the intermediate shaft means extends through the hollow shaft to said last mentioned sun gear.

10. A change-speed transmission according to claim 9, characterized in that the primary clutch half of the first driving clutch means includes a driving drum, the secondary clutch half of the first driving clutch means includes a driving web, the driving drum is connected with a pair of laterally spaced driving webs, the driving web of the secondary clutch half of the first driving clutch means is disposed centrally of the laterally spaced driving webs, an intermediate shaft is connected to the secondary clutch half of the bridging clutch means, one of the laterally spaced driving webs is connected to the intermediate shaft, a hollow shaft is interposed between the first and second driving clutch means, the other lateral driving web is connected to said last mentioned hollow shaft, the intermediate shaft means extends through said last-mentioned hollow shaft, and in that the centrally disposed driving web is connected to the intermediate shaft means.

11. A change-speed transmission according to claim 10, characterized in that the means for drivingly connecting one of the sun gears further includes a one-way clutch means disposed within the driving drum of the primary clutch half of the first driving clutch means.

12. A change-speed transmission according to claim 11, characterized in that the one-way clutch means includes a first and second clutch ring, and in that one of the clutch rings is connected to the central driving web, and the other clutch ring is connected to the intermediate shaft connected to the secondary clutch half of the bridging clutch means.

13. A change-speed transmission according to one of claims 1, 2, 3, 4, 7, 8, 9, 10, 11, or 12, characterized in that each of the pair of ring gears of the planetary gear transmission means have the same number of teeth.

14. A change-speed transmission, comprising a planetary gear transmission means having a plurality of transmission members including a pair of sun gears, a pair of ring gears, a double-webbed planetary gear carrier means carrying at least one main planet gear and at least one auxiliary planet gear, said main planet gear being in meshing engagement with both of said pair of ring gears and with one of said pair of sun gears and the auxiliary planet gear being in meshing engagement with the other of said pair of sun gears, one of said pair of sun gears being a freely rotatable transmission member, engageable means operable to selectively brake one of the ring gears and means to selectively drivingly connect the other sun gear and another transmission member of said planetary gear transmission means with an input shaft of the transmission, and further means operatively connecting said planetary gear transmission means with an output shaft of the transmission including a planetary gear coupling transmission means having a plurality of transmission members, and means operatively connecting one of said pair of ring gears with a first transmission member of said coupling transmission means, one of the transmission members of said planetary gear transmission means with a second transmission member of said coupling transmission means and a third transmission member of said coupling transmission means with the output shaft.

15. A transmission according to claim 14, wherein the transmission member of said planetary gear transmission means connected with said second transmission member is the planetary gear carrier means of said planetar gear transmission means.

16. A transmission according to claim 15, wherein said another transmission member is formed by said planetary gear carrier means.

17. A transmission according to claim 14, wherein the transmission member of said planetary gear transmission means connected with said second transmission member is a ring gear of said pair of ring gears.

18. A transmission according to claim 17, wherein said another transmission member is formed by the other ring gear of said pair of ring gears.

19. A transmission according to claim 14, wherein a free-wheeling clutch means is interconnected in the driving connection between said other sun gear and said input shaft.

20. A transmission according to claim 14, wherein the ring gear of said pair of ring gears located opposite the input shaft is operable to be drivingly connected with a transmission member of the coupling transmission means and the planetary gear carrier means is operable to be drivingly connected with the input shaft.

21. A transmission according to claim 14, wherein the third transmission member of said coupling transmission means is a planet carrier and the second transmission member of the coupling transmission means is a sun gear operable to be drivingly connected with the ring gear of said pair of ring gears nearer the input shaft.

22. A transmission according to claim 14, comprising a hydrodynamic unit having several bladed wheels, a first one of said bladed wheels being connected with the input shaft, means including engageable clutch means drivingly connecting a second bladed wheel with one of the pair of sun gears, means including engageable clutch means drivingly connecting the input shaft with a further transmission member of said planetary gear transmission means, engageable bridging means having primary and secondary clutch halves and operable to fix said first and second bladed wheels relative to one another, said two engageable clutch means being operatively connected between the secondary clutch half of said engageable bridging means and the associated transmission member of said planetary gear transmission means.

* * * * *